US012600565B2

(12) United States Patent (10) Patent No.: US 12,600,565 B2
Ito et al. (45) Date of Patent: Apr. 14, 2026

(54) CEILING DEPOSITORY SYSTEM

(71) Applicant: Murata Machinery, Ltd., Kyoto (JP)

(72) Inventors: Yasuhisa Ito, Ise (JP); Yu Kusama, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 394 days.

(21) Appl. No.: 18/269,581

(22) PCT Filed: Dec. 8, 2021

(86) PCT No.: PCT/JP2021/045131
§ 371 (c)(1),
(2) Date: Jun. 26, 2023

(87) PCT Pub. No.: WO2022/149397
PCT Pub. Date: Jul. 14, 2022

(65) Prior Publication Data
US 2024/0059488 A1 Feb. 22, 2024

(30) Foreign Application Priority Data

Jan. 5, 2021 (JP) ................................. 2021-000565

(51) Int. Cl.
*B65G 1/04* (2006.01)
(52) U.S. Cl.
CPC ......... *B65G 1/0464* (2013.01); *B65G 1/0492* (2013.01)
(58) Field of Classification Search
CPC . B65G 1/0464; B65G 1/0492; H01L 21/6773; H01L 21/67733; H01L 21/67706; H01L 21/67769
See application file for complete search history.

(56) References Cited

U.S. PATENT DOCUMENTS 6,183,184 B1 * 2/2001 Shiwaku .............. B65G 1/0464
414/626
11,171,027 B2 11/2021 Ito
(Continued)

FOREIGN PATENT DOCUMENTS

EP 2071617 A2 6/2009
GB 2568451 A 5/2019
(Continued)

OTHER PUBLICATIONS

International Search Report dated Mar. 1, 2022 in counterpart International Application No. PCT/JP2021/045131 w/English translation.
(Continued)

*Primary Examiner* — Glenn F Myers
(74) *Attorney, Agent, or Firm* — DLA Piper LLP (US)

(57) ABSTRACT

A ceiling storage system includes an overhead transport vehicle and a storage rack. The overhead transport vehicle has a traveling section traveling on rails arranged in a grid pattern, and a body section suspended from the traveling section and configured to hold an article on an underside of the rails. The storage rack has a plurality of suspension members extending in an up-down direction, and having a middle portion provided with a rail support and a bottom end provided with a unit support, and a shelf unit and a scaffolding unit supported by the unit support of the suspension members. The corner portion of the shelf unit and the corner portion of the scaffolding unit are supported by the unit support.

6 Claims, 13 Drawing Sheets

(56)          References Cited

U.S. PATENT DOCUMENTS

| | | | |
|---|---|---|---|
| 11,476,141 B2 | 10/2022 | Ito | |
| 11,631,603 B2 | 4/2023 | Tsubaki et al. | |
| 2008/0217268 A1* | 9/2008 | Yoshida ............ | H01L 21/67766 |
| | | | 211/41.18 |
| 2010/0239400 A1* | 9/2010 | Ishikawa ................ | B65G 37/02 |
| | | | 414/373 |
| 2013/0199892 A1* | 8/2013 | Ota ................... | H01L 21/67769 |
| | | | 198/347.2 |
| 2019/0019707 A1* | 1/2019 | Suzuki ..................... | B25J 9/104 |
| 2022/0332500 A1 | 10/2022 | Masuda | |

FOREIGN PATENT DOCUMENTS

| | | | |
|---|---|---|---|
| WO | 2018/037762 A1 | 3/2018 | |
| WO | 2018/211898 A1 | 11/2018 | |
| WO | 2020/017137 A1 | 1/2020 | |
| WO | 2021/053978 A1 | 3/2021 | |

OTHER PUBLICATIONS

Written Opinion dated Mar. 1, 2022 in counterpart International Application No. PCT/JP2021/045131.
Extended European Search Report dated Nov. 29, 2024, from counterpart European Application No. 21917618.7.

\* cited by examiner (a)

(c)

(b)

(d)

(a)

(b)

CEILING DEPOSITORY SYSTEM

TECHNICAL FIELD

This disclosure relates to a ceiling storage system.

BACKGROUND

As a technology related to a ceiling storage system, a rail-guided vehicle system described in International Publication No. WO 2018/037762, for example, is known. In the rail-guided vehicle system described in WO '762, a rail is arranged in a grid pattern, and an overhead transport vehicle (rail-guided vehicle) transports an article along the rail while holding it below the rail. In the rail-guided vehicle system described in WO '762, a storage rack (rack section of a storage device) is arranged below the rail, and articles are stored in the storage rack. The storage rack is suspended and supported on the ceiling by suspension rods.

In the conventional ceiling storage system described above, the rails are supported at a top end of the suspension rods and the shelf boards are supported at a bottom end of the suspension rods, but no special reference is made to a planar layout of the shelf boards.

It could therefore be helpful to provide a ceiling storage system in which layout design and installation of storage racks can be done easily.

SUMMARY

We thus provide a ceiling storage system including: an overhead transport vehicle having a traveling section traveling on rails arranged at least partly in a grid pattern, and a body section suspended from the traveling section and configured to hold an article on an underside of the rails; and a storage rack arranged below the rails and storing the article. The storage rack has a plurality of suspension members extending in an up-down direction, and having a middle portion provided with a rail support and a bottom end provided with a unit support, and a shelf unit and a scaffolding unit supported by the unit support portion of the suspension members, and a corner portion of the shelf unit and a corner portion of the scaffolding unit are supported by the unit support.

According to this ceiling storage system, a shelf unit and a scaffolding unit are supported at the bottom end of the suspension members configured to support the rails. Articles are placed on the shelf units and stored. Workers can walk on the scaffolding units and perform maintenance work and the like thereon. A corner portion of the shelf unit is supported by the unit support of the suspension member, and a corner portion of the scaffolding unit is supported by the unit support of the suspension member. Therefore, the corner portion of the shelf unit or the scaffolding unit is arranged at a position of the bottom end of the suspension member, thereby making it possible to easily perform layout design of the storage racks. In addition, the construction of the storage racks can be easily performed.

The shelf unit and the scaffolding unit may be in a rectangular shape in plan view. With the shelf unit and the scaffolding unit each in a rectangular shape, layout design of the storage racks can be more easily performed.

The suspension member may include an upper suspension member having a lower end protruding from the rail support and a lower suspension member having an upper end connected to the upper suspension member. When the shelf unit and/or the scaffolding unit are provided, the lower suspension members can be installed, and when not provided, the lower suspension members can be omitted. In other words, the lower suspension members can be selectively arranged, thereby making the construction easier.

The scaffolding unit may be arranged between a shelf unit and another shelf unit. In this example, work convenience is improved.

The rail may include a plurality of first rails extending along a first direction, a plurality of second rails extending along a second direction intersecting the first direction, and a plurality of intersection rails arranged with a gap to an end of each first rail and to an end of each second rail, the gap allowing a coupling section coupling the traveling section to the body section to pass through the gap. Each cell may be defined by a pair of the corresponding first rails aligned in the second direction and a pair of the corresponding second rails aligned in the first direction to form a matrix in a grid pattern. The shelf unit and the scaffolding unit each may have a shape and a size corresponding to the cells of integer pieces aligned in plan view. In this example, the cell defined by the rails serves as the reference for the shelf unit and scaffolding unit. Therefore, the layout design of storage racks can be done more easily, and the construction of the storage racks can be done more easily.

In our systems, the layout design of storage racks can be done easily. In addition, the construction of the storage racks can be easily performed.

REFERENCE SIGNS LIST

Figure 1:
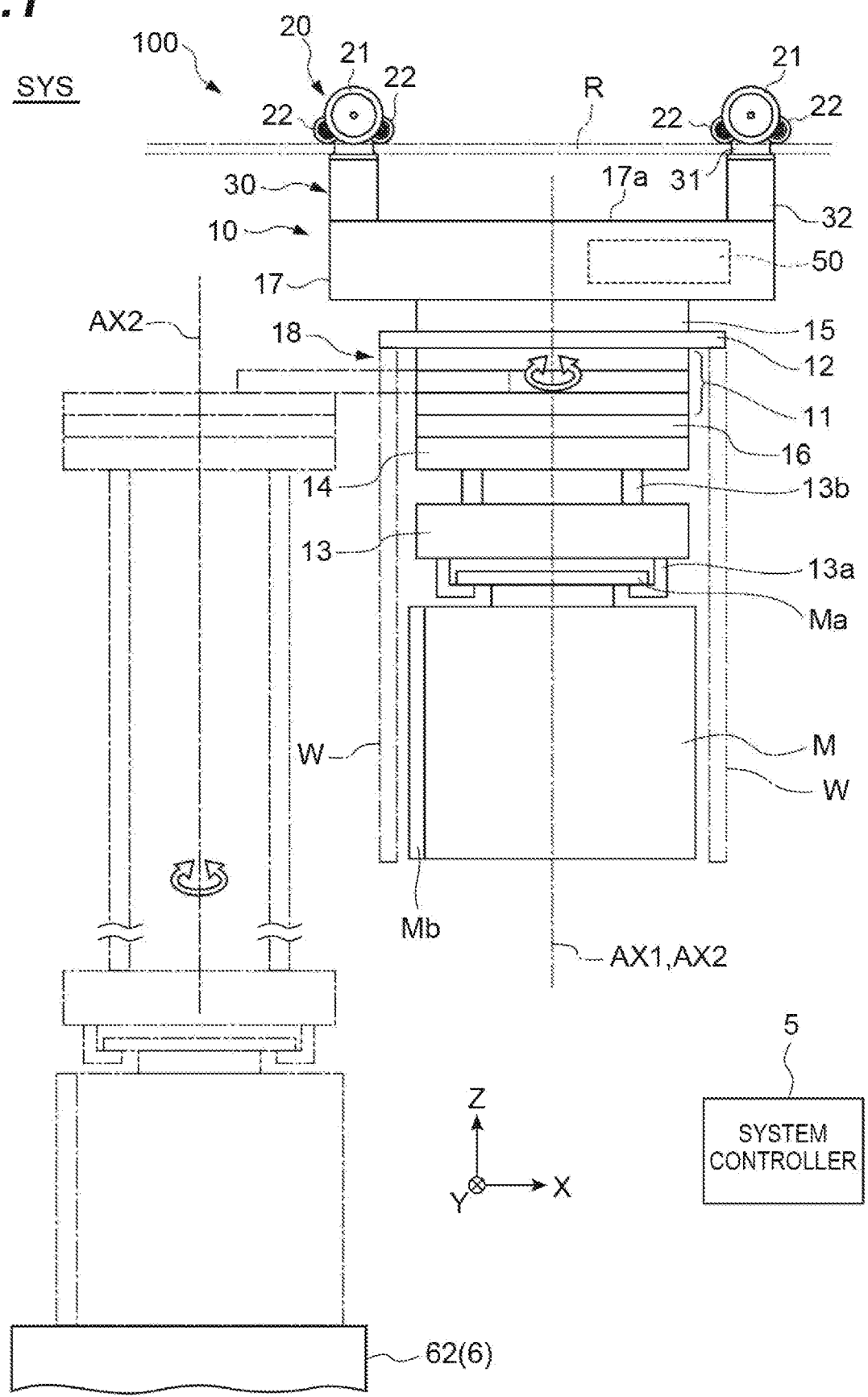
FIG. 1 is a side view illustrating a ceiling storage system according to an example.

4 storage rack
6 processing device
10 body section
13 article holding section
14 lifting drive section
18 transfer device
20 traveling section 62 load port
70 suspension member
70A rail support
70B unit support
71 upper suspension member
72 lower suspension member
80 shelf unit
83 corner portion
90 scaffolding unit
93 corner portion
100 overhead transport vehicle
C cell
D gap
M article
Mb lid
R rail
R1 first rail
R2 second rail
R3 intersection rail
SYS ceiling storage system

DETAILED DESCRIPTION

An example will now be described with reference to the drawings. In the drawings, the scale is changed to be expressed appropriately for convenience of explanation. One direction along a horizontal plane is denoted as an X direction, a horizontal direction orthogonal to the X direction is denoted as a Y direction, and the vertical direction is denoted as a Z direction. The terms "up" and "down" correspond to upper and lower directions in the vertical direction.

Figure 2:
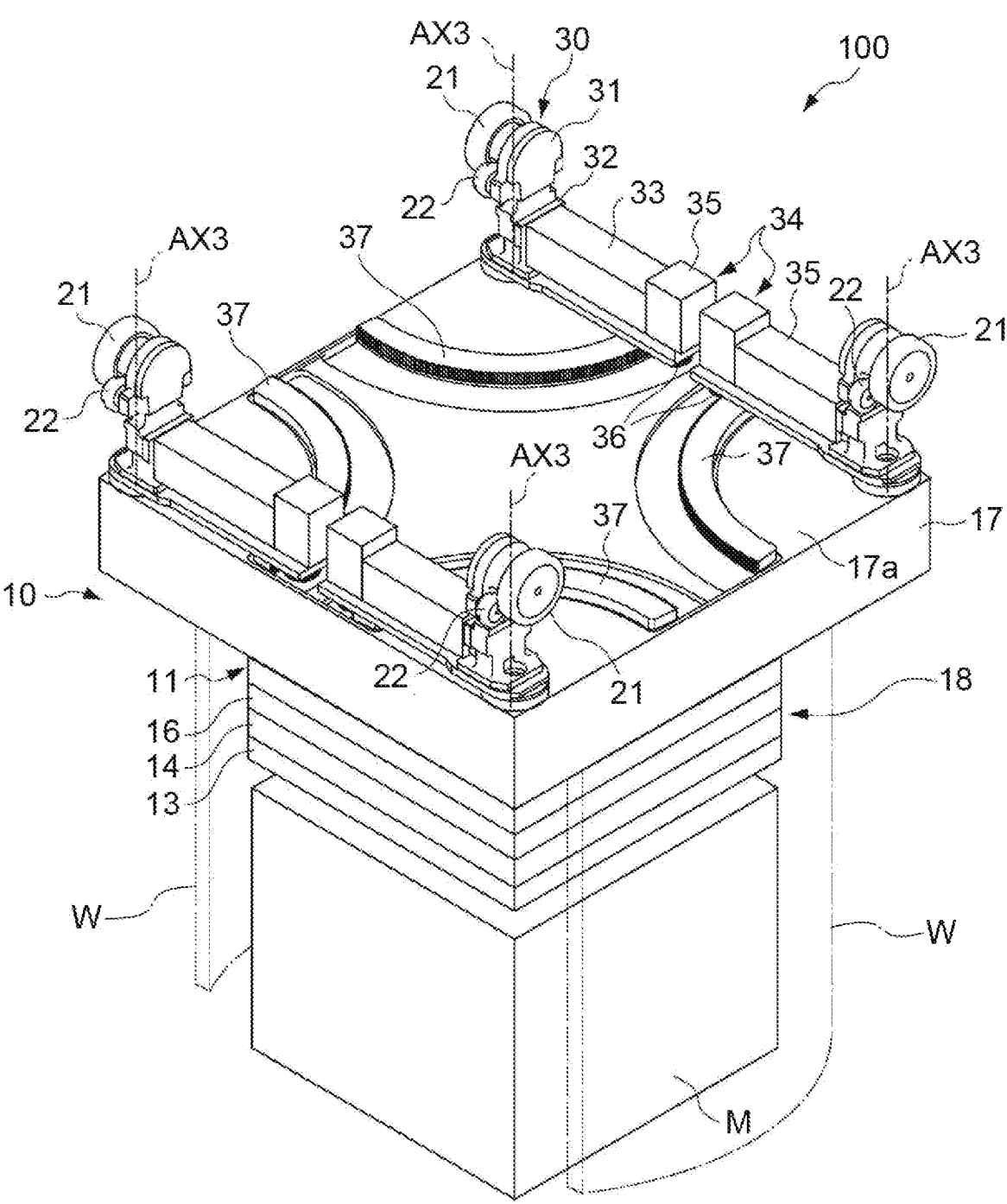
FIG. 2 is a perspective view illustrating an overhead transport vehicle according to the example.
Figure 3:
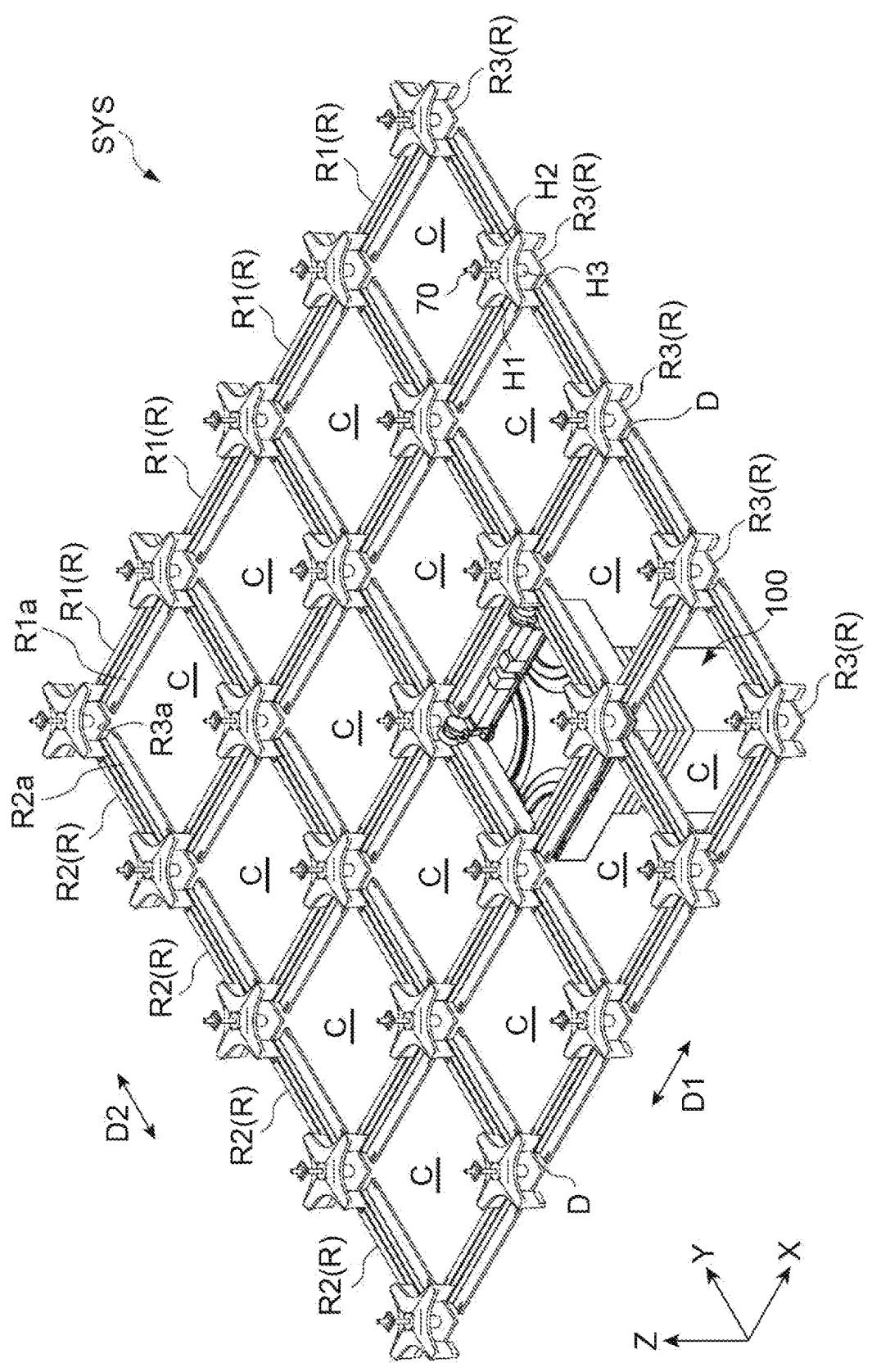
FIG. 3 is a perspective view illustrating the ceiling storage system according to the example.

As illustrated in FIGS. 1, 2, and 3, a ceiling storage system SYS is a system for transporting and storing articles M in a clean room of a semiconductor manufacturing plant, for example, by an overhead transport vehicle 100. The ceiling storage system SYS includes the overhead transport vehicle 100 configured to transport the articles M between a plurality of processing devices 6 and the like, a rail R, a storage rack 4, and a system controller 5. Examples of the articles M include a FOUP configured to accommodate semiconductor wafers and a reticle pod configured to accommodate reticles. A front of the article M is on a side opposite to a lid Mb side of the article M, for example.

The overhead transport vehicle 100 moves along a rail R of the ceiling storage system SYS and transports an article M. The overhead transport vehicle 100 is also referred to as an overhead traveling vehicle because it travels near a ceiling of a building. A plurality of the overhead transport vehicles 100 may be provided, for example. Transporting articles M by the plurality of the overhead transport vehicles 100 enables high-density transportation, which can improve the efficiency of transporting articles M.

The rail R is installed on a ceiling of a building such as a clean room or near the ceiling. The rail R is a grid-patterned rail including a plurality of first rails R1, a plurality of second rails R2, and a plurality of intersection rails R3. The rail R is arranged at least partially in a grid pattern. The first rails R1 are portions forming crossbars in the grid pattern, and are provided along the X direction (first direction). The second rails R2 are portions forming crossbars in the grid pattern, and are provided along the Y direction (second direction). The intersection rails R3 are portions forming intersections in the grid pattern, and are arranged with a gap D to an end of each first rail R1 and to an end of each second rail R2.

In the rail R, the first rails R1 and the second rails R2 are provided along orthogonal directions, whereby a plurality of cells C (compartments) are adjacent to each other in plan view. The cells C form a matrix in the grid pattern of rail R. Each cell C is an area defined by a pair of the corresponding first rails R1 aligned in the Y direction and a pair of the corresponding second rails R2 aligned in the X direction. In FIG. 3, part of the rail R is illustrated, and the same configuration of the rail R is formed continuously in the X direction and the Y direction from the illustrated configuration. The first rails R1, the second rails R2, and the intersection rails R3 are suspended and supported on the ceiling 200 by suspension members 70. Details of the suspension members 70 will be later described (refer to FIGS. 3 and 5).

The first rails R1, the second rails R2, and the intersection rails R3 have traveling surfaces R1a, R2a, and R3a, respectively, on which traveling wheels 21 (described later) of each overhead transport vehicle 100 travel. The gap D is a space through which a coupling section 30 described later, which is a part of the overhead transport vehicle 100, passes when the overhead transport vehicle 100 travels on a first rail R1 and crosses a second rail R2, or when it travels on a second rail R2 and crosses a first rail R1. The gap D is provided to have a width that allows the coupling section 30 to pass therethrough. The first rails R1, the second rails R2, and the intersection rails R3 are provided along the same horizontal plane.

As illustrated in FIGS. 1 and 2, the overhead transport vehicle 100 is a transport vehicle capable of traveling along the rail R, and includes a body section 10, a traveling section 20, the coupling section 30, and a vehicle controller 50. The body section 10 is arranged below the rail R. The body section 10 is formed in a rectangular shape, for example, in plan view. The body section 10 is formed to have dimensions that fit into one cell C in the rail R in plan view. This allows the overhead transport vehicle 100 to pass another one traveling on the adjacent first rail R1 or the adjacent second rail R2. The body section 10 is suspended from the traveling section 20 and holds an article M below the rail R. The body section 10 includes an upper unit 17 and a transfer device 18.

The upper unit 17 is suspended and supported by the traveling section 20 with the coupling section 30 interposed therebetween. The upper unit 17 is rectangular in plan view, for example, and has four corner portions on an upper surface 17a thereof. On each of the four corner portions of the body section 10, a traveling wheel 21, the coupling section 30, and a direction-changing mechanism 34 are provided.

The transfer device 18 is a device capable of transferring an article M to and from at least the storage rack 4 and a load port 62. The transfer device 18 is provided below the upper unit 17. The transfer device 18 includes an article holding section 13 configured to hold an article M, a lifting drive section 14 configured to raise and lower the article holding section 13 in the vertical direction, a slide drive section 11 configured to slide and move the lifting drive section 14, a turning unit 12 configured to hold the slide drive section 11, a first pivoting drive section 15 configured to horizontally pivot (rotationally drive) the slide drive section 11 about a first vertical axis AX1 with respect to the body section 10, and a second pivoting drive section 16 configured to horizontally pivot the lifting drive section 14 about a second vertical axis AX2 with respect to the slide drive section 11.

The lifting drive section 14 and the slide drive section 11 constitute a linear drive section configured to drive the article holding section 13 to move linearly. A first pivoting drive section 15 and a second pivoting drive section 16 constitute a pivoting drive unit configured to drive the article holding section 13 to horizontally pivot. Horizontally pivoting means pivoting about an axis along the vertical direction as the axis of rotation.

The slide drive section 11 includes a plurality of movable plates arranged in a stacked manner in the Z direction, for example. The movable plates are movable in the Y direction. To the lowermost movable plate, the second pivoting drive section 16 is attached. The slide drive section 11 can move the movable plates by a driving device (not illustrated) and slide and move the lifting drive section 14 and the article holding section 13 attached to the lowermost movable plate to protrude in one direction with respect to the traveling direction, that is, in one direction of linear directions. The turning unit 12 is attached to the first pivoting drive section 15 between the slide drive section 11 and the upper unit 17, and holds the slide drive section 11.

The article holding section 13 grips the flange Ma of an article M, thereby suspending and holding the article M. The article holding section 13 is, for example, a chuck including horizontally movable claws 13*a*. By causing the claws 13*a* to proceed to below the flange Ma of the article M and raising the article holding section 13, the article M is held. The article holding section 13 is connected to suspension members 13*b* such as wires or belts.

The lifting drive section 14 is attached to the second pivoting drive section 16. The lifting drive section 14 is, for example, a hoist configured to lower the article holding section 13 by paying out the suspension members 13*b* and raise the article holding section 13 by winding the suspension members 13*b*. The lifting drive section 14 is controlled by the vehicle controller 50 to lower or raise the article holding section 13 at a predetermined speed. The lifting drive section 14 is controlled by the vehicle controller 50 to hold the article holding section 13 at a target height.

The first pivoting drive section 15, for which an electric motor or the like is used, rotates the turning unit 12 about the first vertical axis AX1. The first pivoting drive section 15 can rotate the turning unit 12 and also rotate the slide drive section 11 about the first vertical axis AX1. When the slide drive section 11 is rotated about the first vertical axis AX1 by the first pivoting drive section 15, the second pivoting drive section 16, the lifting drive section 14, and the article holding section 13 that are attached to the lower side of the slide drive section 11 are rotated together about the first vertical axis AX1. The second pivoting drive section 16, for which an electric motor or the like is used, rotates the lifting drive section 14 about the second vertical axis AX2.

As illustrated in FIGS. 1, 2, and 3, the traveling section 20 travels on the rail R. The traveling section 20 includes the traveling wheels 21 and auxiliary wheels 22. The traveling wheels 21 are arranged at the respective four corner portions of the upper surface 17*a* of the upper unit 17 (the body section 10). Each traveling wheel 21 is attached to an axle (not illustrated) provided to the corresponding coupling section 30. The axles are provided parallel or substantially parallel along the XY plane. Each traveling wheel 21 is rotated by the driving force of the traveling drive unit 33 described later. Each traveling wheel 21 rolls on the rail R. The respective traveling wheels 21 roll on the traveling surfaces R1*a*, R2*a*, and R3*a* of the first rail R1, the second rails R2, and the intersection rails R3 in the rail R, thereby causing the overhead transport vehicle 100 to travel. Herein, all of the four traveling wheels 21 do not necessarily have to be rotationally driven by the driving force of the traveling drive unit 33, and only some of the four traveling wheels 21 may be configured to be rotationally driven.

Each traveling wheel 21 is provided to be able to pivot about a pivot axis AX3. The traveling wheel 21 is horizontally pivoted by the corresponding direction-changing mechanism 34 described later, whereby the traveling direction of the overhead transport vehicle 100 can be changed. The auxiliary wheels 22 are arranged each in front of and rear of the traveling wheel 21 in the traveling direction. Each of the auxiliary wheels 22 can rotate in the same manner as the traveling wheel 21. The lower ends of the auxiliary wheels 22 are set higher than the lower end of the traveling wheel 21. Thus, when the traveling wheel 21 is traveling on the traveling surfaces R1*a*, R2*a*, and R3*a*, the auxiliary wheels 22 do not come into contact with the traveling surfaces R1*a*, R2*a*, and R3*a*. When the traveling wheel 21 passes over a gap D (refer to FIG. 3), the auxiliary wheels 22 come into contact with the traveling surfaces R1*a*, R2*a*, and R3*a* to prevent the traveling wheel 21 from falling. Herein, two auxiliary wheels 22 do not necessarily have to be provided to one traveling wheel 21. For example, one auxiliary wheel 22 may be provided to one traveling wheel 21, or no auxiliary wheel 22 may be provided.

As illustrated in FIG. 1, in the traveling section 20, a cover W may be provided to surround the transfer device 18 and the article M held in the transfer device 18. The cover W has a shape that is open at the lower end thereof, and has such a shape that a portion thereof through which the movable plates of the slide drive section 11 protrude (portion through which they slide and move) is recessed. The cover W, the upper end of which is attached to the turning unit 12, turns about the first vertical axis AX1 as the turning unit 12 turns.

The coupling sections 30 couple the upper unit 17 of the body section 10 to the traveling section 20. The coupling sections 30 are provided at the respective four corner portions of the upper surface 17*a* of the upper unit 17 (the body section 10). By these coupling sections 30, the body section 10 is suspended and arranged below the rail R. Each coupling section 30 includes a support member 31 and a connecting member 32. The support member 31 rotatably supports the rotating shaft of the corresponding traveling wheel 21 and the rotating shafts of the corresponding auxiliary wheels 22. The support member 31 maintains the relative position between the traveling wheel 21 and the auxiliary wheels 22. The support member 31 is formed in a plate-like shape, for example, and is formed to have a thickness capable of passing through each gap D.

The connecting member 32 extends downward from the support member 31 and is coupled to the upper surface 17*a* of the upper unit 17 to hold the upper unit 17. The connecting member 32 includes inside a transmission mechanism configured to transmit the driving force of the traveling drive unit 33 described later to the traveling wheel 21. This transmission mechanism may have a configuration using a chain or a belt, or may have a configuration using a gear train. The connecting member 32 is provided to be rotatable about the pivot axis AX3. This connecting member 32 rotates about the pivot axis AX3, thereby being able to horizontally pivot the traveling wheel 21.

Each coupling section 30 is provided with the traveling drive unit 33 and the direction-changing mechanism 34. The traveling drive unit 33 is mounted on the corresponding connecting member 32. The traveling drive unit 33 is a driving source configured to drive the traveling wheel 21 and, for example, an electric motor is used therefor. Each of the four traveling wheels 21 is driven by the corresponding traveling drive unit 33 to serve as a driving wheel. The four traveling wheels 21 are controlled by the vehicle controller 50 to have the same or substantially the same rotation speed. If any of the four traveling wheels 21 is not used as a driving wheel, the traveling drive unit 33 is not mounted on the corresponding connecting member 32.

The direction-changing mechanism 34 horizontally pivots the traveling wheel 21 by pivoting the connecting member 32 of the coupling section 30 about the pivot axis AX3 with respect to the body section 10. By horizontally pivoting the traveling wheel 21, the overhead transport vehicle 100 can switch from a first state of traveling in the X direction to a second state of traveling in the Y direction, or from the second state of traveling in the Y direction to the first state of traveling in the X direction.

The direction-changing mechanism 34 includes a driving source 35, a pinion gear 36, and a rack 37. The driving source 35 is attached on a side surface of the traveling drive unit 33 away from the pivot axis AX3. For the driving source 35, for example, an electric motor is used. The pinion gear 36 is attached to a lower side of driving source 35, and is rotated by the driving force generated by the driving source 35. The pinion gear 36 is circular in plan view and has a plurality of teeth in the circumferential direction of its outer circumference. The rack 37 is fixed to the upper surface 17a of the upper unit 17. The rack 37 is provided at each of the four corner portions of the upper surface 17a of the upper unit 17, and is formed in an arc shape centered around the pivot axis AX3 of the corresponding traveling wheel 21. The rack 37 has a plurality of teeth, which mesh with the teeth of the pinion gear 36, in the circumferential direction of its outer circumference. The pinion gear 36 and the rack 37 are arranged with their teeth meshing with each other. When the pinion gear 36 rotates, the pinion gear 36 accordingly moves in the circumferential direction centered around the pivot axis AX3 along the outer circumference of the rack 37. By this movement of the pinion gear 36, the connecting member 32 is pivoted, and the traveling drive unit 33 and the direction-changing mechanism 34 are pivoted together with the pinion gear 36 in the circumferential direction centered around the pivot axis AX3.

By this pivoting of the direction-changing mechanism 34, each of the traveling wheels 21 and the auxiliary wheels 22 arranged at the four corner portions of the upper surface 17a is horizontally pivoted about the pivot axis AX3. The driving of the direction-changing mechanism 34 is controlled by the vehicle controller 50. The vehicle controller 50 may give an instruction to pivot the four traveling wheels 21 at the same timing, or may give an instruction to pivot them at different timings. By pivoting the traveling wheels 21 and the auxiliary wheels 22, the traveling wheels 21 shift from a state of being in contact with one of the first rails R1 and the second rails R2 to a state of being in contact with the other. This allows the overhead transport vehicle 100 to switch between the first state of traveling in the X direction and the second state of traveling in the Y direction.

The vehicle controller 50 is a computer including a central processing unit (CPU), a read only memory (ROM), and a random access memory (RAM). The vehicle controller 50 can be configured, for example, as software such that a program stored in the ROM that is loaded into the RAM to be executed by the CPU. The vehicle controller 50 may be configured as hardware such as an electronic circuit. The vehicle controller 50 may be configured with a single device, or may be configured with a plurality of devices. If it is configured with a plurality of devices, those devices are connected via a communication network such as the Internet or an intranet to logically construct a single vehicle controller 50. The vehicle controller 50 is provided in the body section 10, but may be provided outside the body section 10.

The vehicle controller 50 collectively controls operations of the respective components of the overhead transport vehicle 100. The vehicle controller 50 controls operation of the overhead transport vehicle 100 on the basis of transport instructions. The vehicle controller 50 controls traveling of the overhead transport vehicle 100 by controlling the traveling drive unit 33 and the direction-changing mechanism 34, for example. The vehicle controller 50 controls transfer operation of the overhead transport vehicle 100 on the basis of transfer instructions. The vehicle controller 50 controls the transfer operation of the overhead transport vehicle 100 by controlling the transfer device 18, for example. The vehicle controller 50 generates and updates status information periodically. The vehicle controller 50 transmits the status information to the system controller 5. The status information is, for example, information on the current position of the overhead transport vehicle 100, information indicating the current status of the overhead transport vehicle 100 such as normal or abnormal, and information on the status (execution in progress, execution completed, or execution failed) of various instructions such as transport instructions executed by the overhead transport vehicle 100.

The system controller 5 is a computer including a CPU, a ROM, and a RAM. The system controller 5 can be configured, for example, as software such that a program stored in the ROM is loaded into the RAM to be executed by the CPU. The system controller 5 may be configured as hardware such as an electronic circuit. The system controller 5 may be configured with a single device, or may be configured with a plurality of devices. If it is configured with a plurality of devices, they are connected via a communication network such as the Internet or an intranet to logically construct a single system controller 5.

The system controller 5 generates a transport instruction. The system controller 5 selects any one of the overhead transport vehicles 100 capable of transporting an article M, and assigns the transport instruction to the selected overhead transport vehicle 100. The transport instruction includes a traveling instruction to perform traveling to a transport source, an instruction to grab an article M placed on the transport source, a traveling instruction to perform traveling to a transport destination, and an instruction to unload the article M being held onto the transport destination. A traveling path to be followed when traveling to a load port 62 at the transport source on the rail R can be acquired by various known methods. A traveling path to be followed when traveling to a load port 62 at the transport destination on the rail R can likewise be acquired by various known methods.

Figure 4:
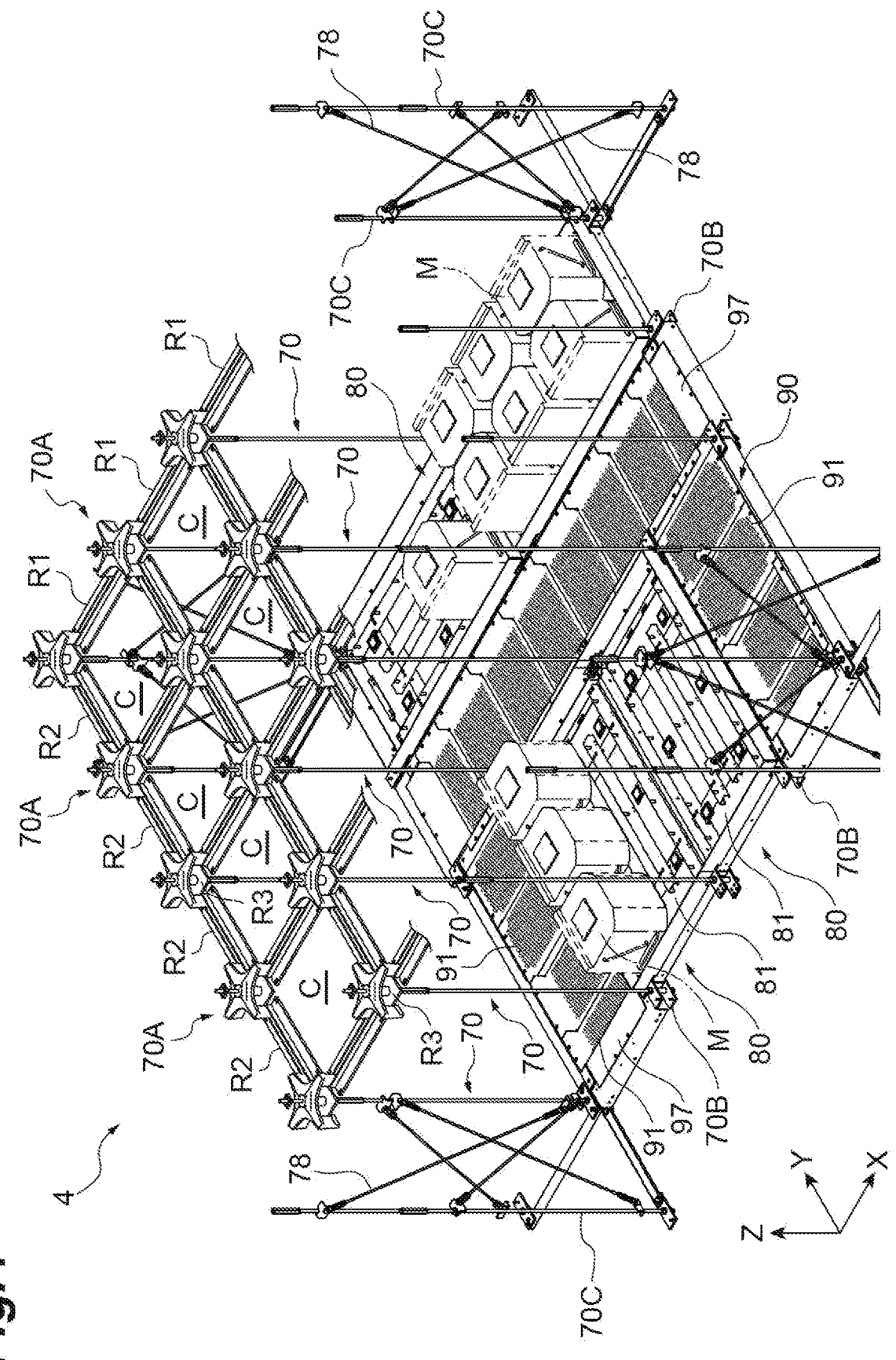
FIG. 4 is a perspective view illustrating a storage rack provided below rails.
Figure 5:
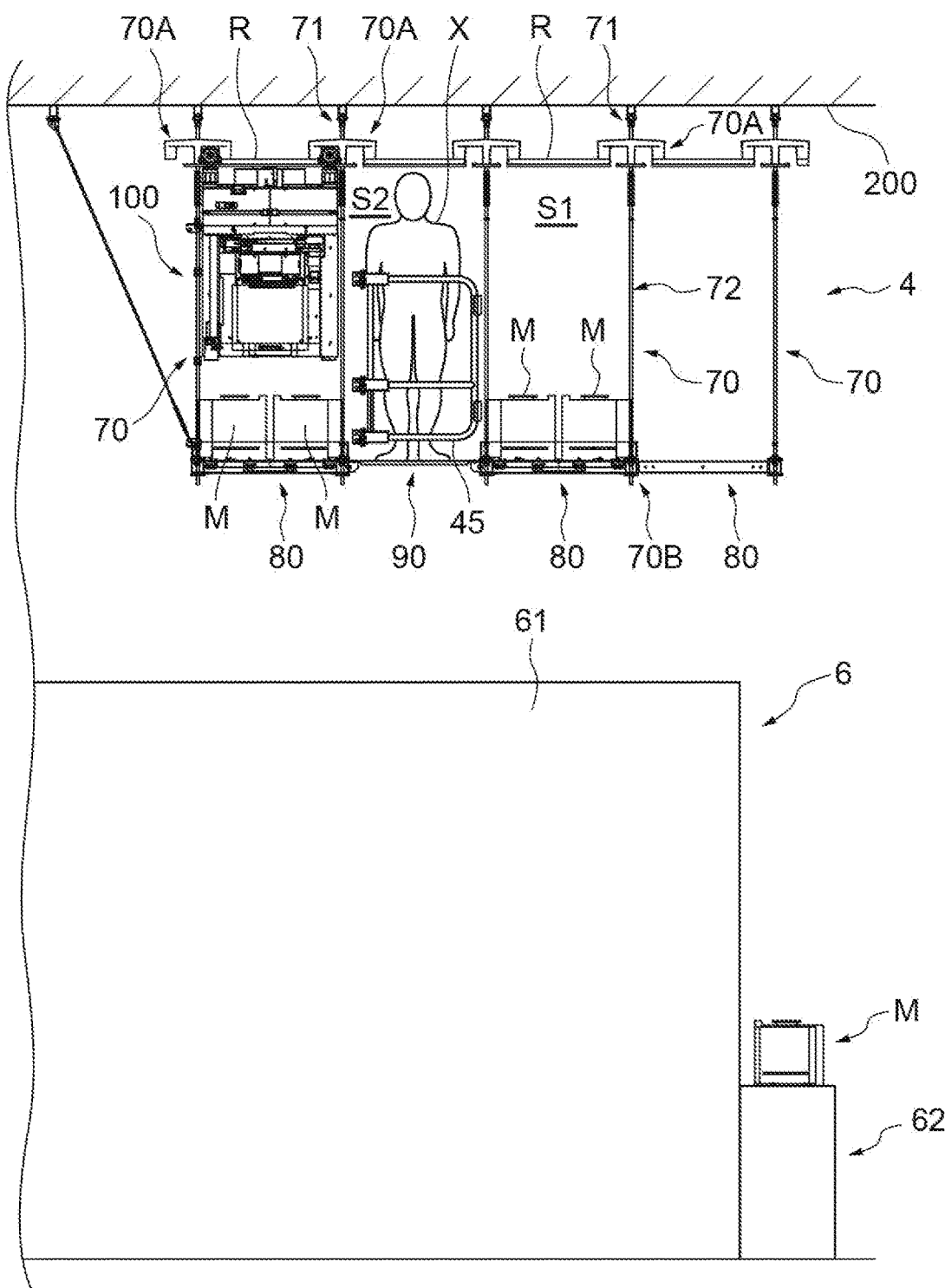
FIG. 5 is a front view of the storage rack and a V-V arrow view of FIG. 6.

The storage racks 4 in this form are then described in detail with reference to FIGS. 4 to 8. As illustrated in FIGS. 4 and 5, the storage rack 4 is arranged below the rail R. In FIG. 4, part of the rail R is broken off to facilitate understanding of each configuration on the storage rack 4. The storage rack 4 receives and stores the article M from the overhead transport vehicle 100. The storage rack 4 is an overhead buffer (OHB). The storage rack 4 is provided at a position and within a range overlapping at least one cell C in plan view. The storage rack 4 is suspended from the ceiling 200 by a plurality of the suspension members 70. The suspension member 70 extends in the up-down direction in plan view at a position of a corner of the cell C (grid point), that is, at a position where the intersection rail R3 is arranged. The overhead transport vehicle 100 can pass between the suspension members 70 and 70. The suspension members 70 are arranged without interfering with the travel of the overhead transport vehicle 100, and such a configuration allows the storage rack 4 to be installed.

Figure 6:
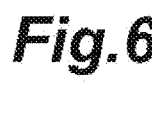
FIG. 6 is a plan view illustrating the storage rack of FIG. 5.

As illustrated in FIGS. 5 and 6, the storage rack 4 is arranged above the processing device 6, for example. The storage rack 4 may be arranged in plan view at a position overlapping with the device body 61 of the processing device 6, and this arrangement allows effective use of the space above the device body 61. The storage rack 4 is arranged in a position not overlapping with the load port 62 to transfer the article M to the load port 62 of the processing device 6 (refer to FIG. 6). As illustrated in FIG. 5, the storage rack 4 is arranged between the ceiling 200 and the device body 61. The storage rack 4 is arranged above the device body 61, spaced apart from the device body 61, but the height of the lower end of the storage rack 4 is not particularly limited and may be set as appropriate.

Figure 8:
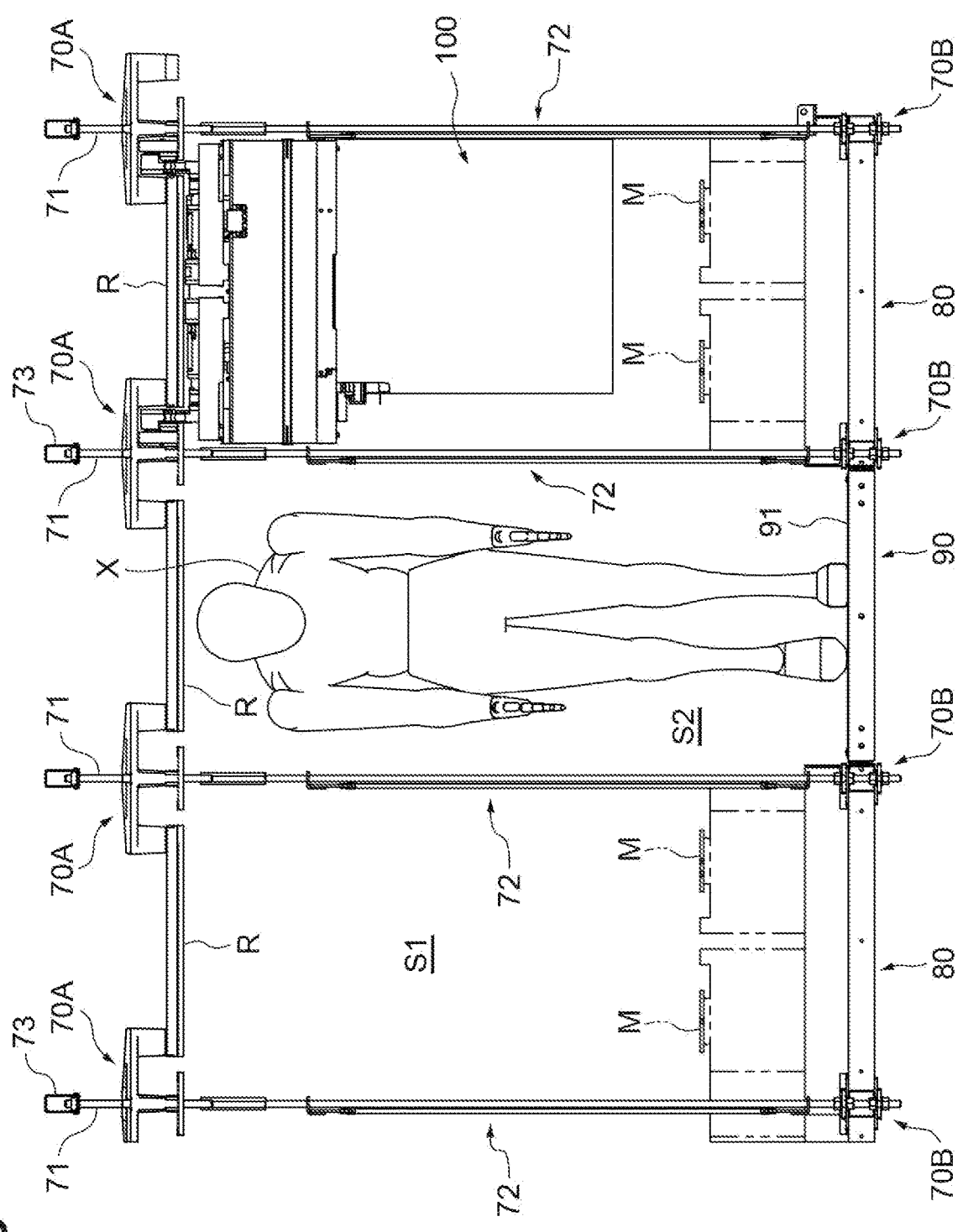
FIG. 8 is a front view illustrating the storage rack and a VIII-VIII line arrow view of FIG. 6.
Figure 9:
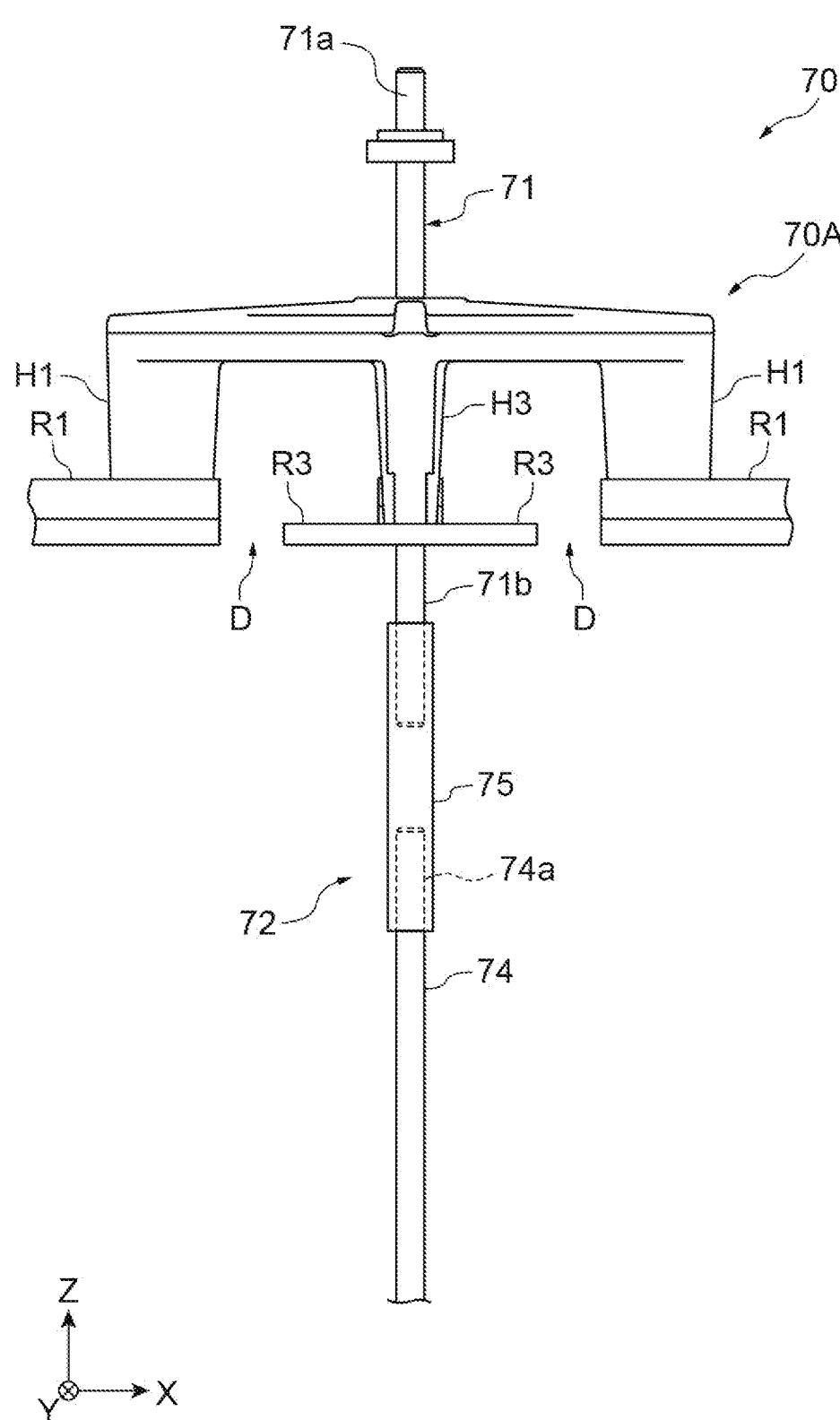
FIG. 9 is a side view of the structure near the rail support in the suspension member.

As illustrated in FIGS. 4 to 6, the storage rack 4 has a shelf unit 80 on which the article M can be placed (stored) and a scaffolding unit 90 on which a worker X can walk during maintenance and other operations. Maintenance in the ceiling storage system SYS is, for example, maintenance of the overhead transport vehicle 100, maintenance of the rails R, and maintenance of the shelf unit 80 (storage rack 4), or the like. The scaffolding unit 90 is also called a catwalk. Each shelf unit 80 includes one or a plurality of unit bodies 81. Each scaffolding unit 90 includes one or a plurality of unit bodies 91. The unit body 81 and the unit body 91 are installed at substantially the same height, for example. As illustrated in FIGS. 5 and 8, a rail support 70A configured to support the rail R is provided to the middle portion of the suspension member 70 in the up-down direction. A unit support 70B configured to support the shelf unit 80 and the scaffolding unit 90 are provided to the bottom end of the suspension member 70. The rail support 70A and the unit support 70B are spaced apart in the up-down direction. The rail R, the shelf unit 80, and the scaffolding unit 90 are spaced apart from each other in the up-down direction. A space S1 between the rail R and the shelf unit 80 allows the passage of the body section 10 of the overhead transport vehicle 100 and the storage of the article M. A space S2 between the rail R and the scaffolding unit 90 allows boarding and passing of the worker X.

The storage rack 4 is provided with stairs (not illustrated) or the like connected to the scaffolding unit 90, thereby allowing the worker X to step onto the scaffolding unit 90. The worker X on the scaffolding unit 90 can access the shelf unit 80 and the article M on the shelf unit 80. Because another portions of the storage rack 4 are illustrated in FIG. 4 and in FIGS. 5, 6, and 8, the arrangement of the shelf unit 80 and the scaffolding unit 90 illustrated in these figures appears different.

As illustrated in FIG. 4, the corners of the storage rack 4 may be provided with suspension rods 70C and diagonal members 78 configured to prevent the storage rack 4 from swaying. As illustrated in FIGS. 5 and 6, a handrail 45 is provided at a position of the end of the scaffolding unit 90 for safety measures (fall prevention). In the ceiling storage system SYS, the worker X can work while the overhead transport vehicle 100 is in operation, and various safety measures are taken to the worker X. For example, while the worker X is working on scaffolding unit 90, the system controller 5 prohibits the overhead transport vehicle 100 from traveling on the scaffolding unit 90. In such instances, stoppers or the like may be installed to physically prevent the overhead transport vehicle 100 from entering an area being worked on the scaffolding unit 90.

As illustrated in FIGS. 4 and 6, in the storage rack 4, a plurality of unit bodies 81 and a plurality of unit bodies 91 are aligned in one or a plurality of rows. In the storage rack 4 of this example, each of the shelf unit 80 and the scaffolding unit 90 has a shape and size corresponding to the cells C of integer pieces aligned in plan view.

As illustrated in FIG. 6, the scaffolding unit 90 is arranged between the shelf unit 80 and the other shelf unit 80. In other words, on both sides of the scaffolding units 90 aligned in one or more rows, the scaffolding units 90 are aligned in one or a plurality of rows. With this configuration, the work convenience for the worker X is improved.

For example, a first shelf unit 80A illustrated in FIG. 7(a) is rectangular in plan view and has a shape and size corresponding to two adjacent cells C. A second shelf unit 80B illustrated in FIG. 7(b) is rectangular in plan view and has a shape and size corresponding to one cell C. The second shelf unit 80B may be of a square shape in plan view. Six articles M can be placed on a first unit body 81A of the first shelf unit 80A. Two articles M can be placed on a second unit body 81B of the second shelf unit 80B.

Each of the first unit body 81A and the second unit body 81B has a positioning pin 46. The positioning pin 46 is provided on a sub frame member 86 (refer to FIG. 10) in a manner of protruding upward. The positioning pin 46 fits into a groove on a bottom surface of an article M to position the article M when the article M is placed on a predetermined position on the shelf unit 80. On the storage rack 4, the article M with the lid Mb facing outside of the space S1, for example, can be placed. On the storage rack 4, the article M with a rounded side opposite to the lid Mb side facing the inside of the space S1, for example, can be placed. The article placed on the shelf unit 80 is contained within a range of the space S1 and do not extend beyond an outer edge of the first unit body 81A or the second unit body 81B.

As described above, the shelf unit 80 includes the first unit body 81A, which is equivalent to a size of 1×2, and the second unit body 81B, which is equivalent to a size of 1×1, with the cell C as one unit, but the shelf unit 80 may include unit bodies of other sizes than these sizes. The shelf unit 80 may include a unit body having a shape and size corresponding to the cells C of m×n pieces (m and n are each one or more integers).

The first scaffolding unit 90A, illustrated in FIG. 7(c), is rectangular in plan view and has a shape and size corresponding to the two adjacent cells C. The second scaffolding unit 90B, illustrated in FIG. 7(d), is rectangular in plan view and has a shape and size corresponding to the one cell C. The second scaffolding unit 90B may be of a square shape in plan view. The first unit body 91A of the first scaffolding unit 90A is made of, for example, four scaffolding plates 92 laid out. The second unit body 91B of the second scaffolding unit 90B is made of, for example, two scaffolding plates 92 laid out. The scaffolding plate 92 is a member having a plurality of holes such as grating, perforated metal or the like.

Figure 7:
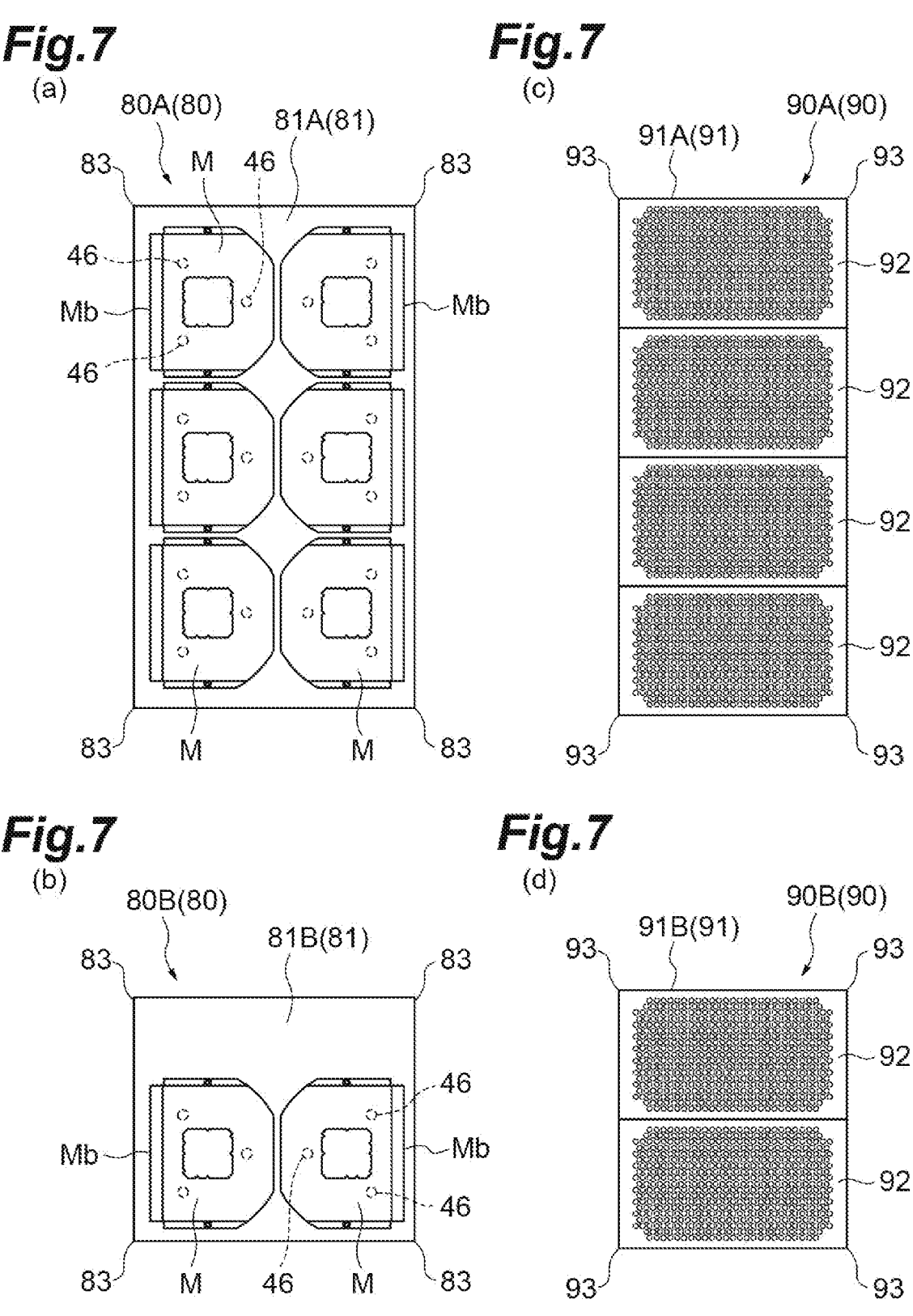
FIGS. 7(*a*) and 7(*b*) are plan views illustrating two types of shelf units, and FIGS. 7(*c*) and 7(*d*) are plan views illustrating two types of scaffolding units.

As illustrated in FIGS. 6 and 7, in the storage rack 4, all or any part of corner portions 83 of the shelf unit 80 is supported by the unit support 70B, and all or any part of corner portions 93 of the scaffolding unit 90 is supported by the unit support 70B. Thus, with this configuration in which the shelf units 80 and the scaffolding units 90 modularized with the cell C as the unit are aligned, and their corner portions 83 and 93 are suspended and supported by the unit supports 70B, complex arrangements are eliminated and the arrangement of each unit is simplified. This configuration is advantageous from a viewpoint of layout design.

The details of the configuration of the suspension member 70 are then described with reference to FIGS. 9 to 13. First, the rail support 70A is described with reference to FIG. 9. The rail support 70A provided in a middle portion of the suspension member 70 has first portions H1 for suspending the first rails R1, second portions H2 for suspending the second rails R2, and third portions H3 for suspending the intersection rails R3. The third portion H3 is arranged between a pair of the first portion H1 and the second portion H2 spaced apart in the X direction and arranged between another pair of the first portion H1 and the second portion H2 spaced apart in the Y direction.

The suspension member 70 includes an upper suspension member 71 having a lower end 71b protruding from the rail support 70A, and a lower suspension member 72 having an upper end connected to the upper suspension member 71. The upper end 71a of the upper suspension member 71 is fixed to the ceiling 200 using, for example, a mounting bracket 73 (refer to FIG. 8). The rail support 70A is fixed to the upper suspension member 71. An upper end 74a of a rod section 74 is connected to the lower end 71b of the upper suspension member 71 via a connecting member 75 of a cylindrical shape. The connecting member 75 and the rod section 74 constitute part of the lower suspension member 72. The lower suspension member 72 can be optionally attached to the upper suspension member 71. In other words, the lower suspension member 72 is detachable from the upper suspension member 71. If there is no corner portion 83 of the shelf unit 80 or no corner portion 93 of the scaffolding unit 90 to be supported below the upper suspension member 71 in the vertical direction, the lower suspension member 72 is not provided.

The unit support 70B is then described with reference to FIGS. 10 to 13. The unit support 70B collectively supports (holds) a plurality of the corner portions 83 that are assembled in close proximity to the grid point of the cell C when the shelf unit 80 and the shelf unit 80 are aligned adjacent to each other. The unit support 70B collectively supports (holds) the corner portions 83 and 93 that are assembled in close proximity to the grid point of the cell C when the shelf unit 80 and the scaffolding unit 90 are aligned adjacent to each other. The unit support 70B collectively supports (holds) a plurality of the corner portions 93 that are assembled in close proximity to the grid point of the cell C when the scaffolding unit 90 and the scaffolding unit 90 are aligned adjacent to each other.

Figure 10:
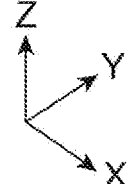
FIG. 10 is a perspective view illustrating the structure of a unit support in the suspension member.

As illustrated in FIG. 10, each of the shelf unit 80 and the scaffolding unit 90 forms a rigid body including a plurality of frame members. For example, the unit body 81 of shelf unit 80 includes a first main frame member 84 extending in the Y direction and a second main frame member 85 extending in the X direction. The first main frame member 84 and the second main frame member 85 are both steel members having a cross section of a rectangular and hollow, and are joined together at the corner portion 83 by bolting or welding. In the inside of a framework framed by the first main frame member 84 and the second main frame member 85, for example, a plurality of the sub frame members 86 extending in the Y direction are bridged over a support frame member 87 extending in the X direction. The positioning pins 46 described above are provided for these sub frame members 86 in a protruding manner.

Figure 11:
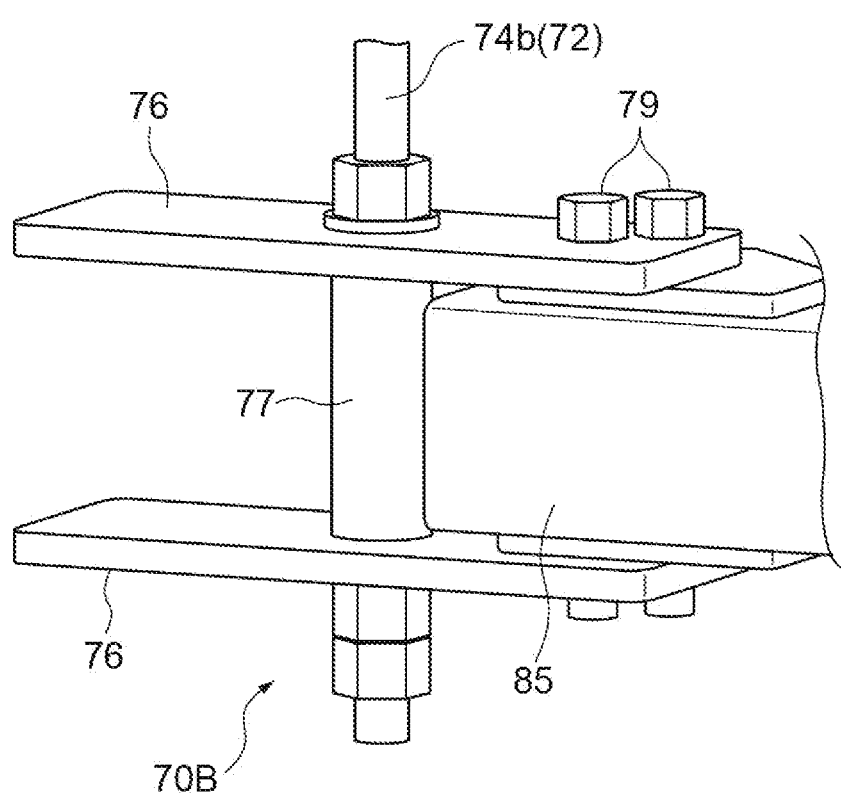
FIG. 11 is a perspective view illustrating an example of a support structure in the unit support.
Figure 12:
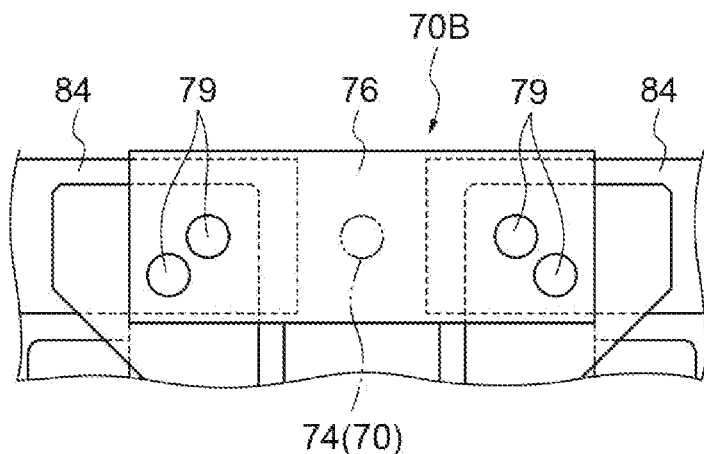
FIGS. 12(*a*) and 12(*b*) are plan views illustrating an example of the support structure in the unit support.
Figure 12:
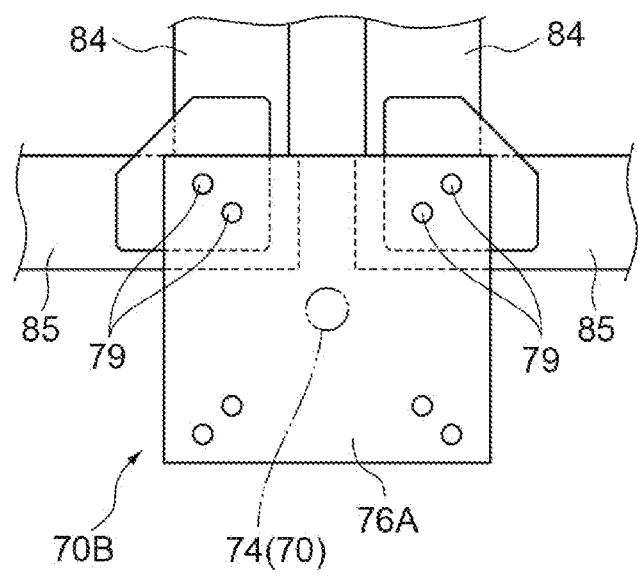

As illustrated in FIG. 11, the lower end 74b of the rod section 74 is provided with a pair of pincer members 76 of a plate-like shape spaced apart in the Z direction. A portion that is the lower end 74b of the rod section 74 and that is between the pincer members 76 is provided with a large diameter portion 77 defining a space of the pincer members 76 in the Z direction. With the second main frame member 85 (or a portion of the frame such as the first main frame member 84) sandwiched between the pincer members 76, the second main frame member 85 is fixed to the unit support 70B by bolts 79 and nuts or the like. The lower end 74b of the rod section 74, the pincer member 76, the large diameter portion 77, and the bolt 79 constitute the unit support 70B. Thus, the unit support 70B is fixed to the bottom end of the lower suspension member 72.

Figure 13:
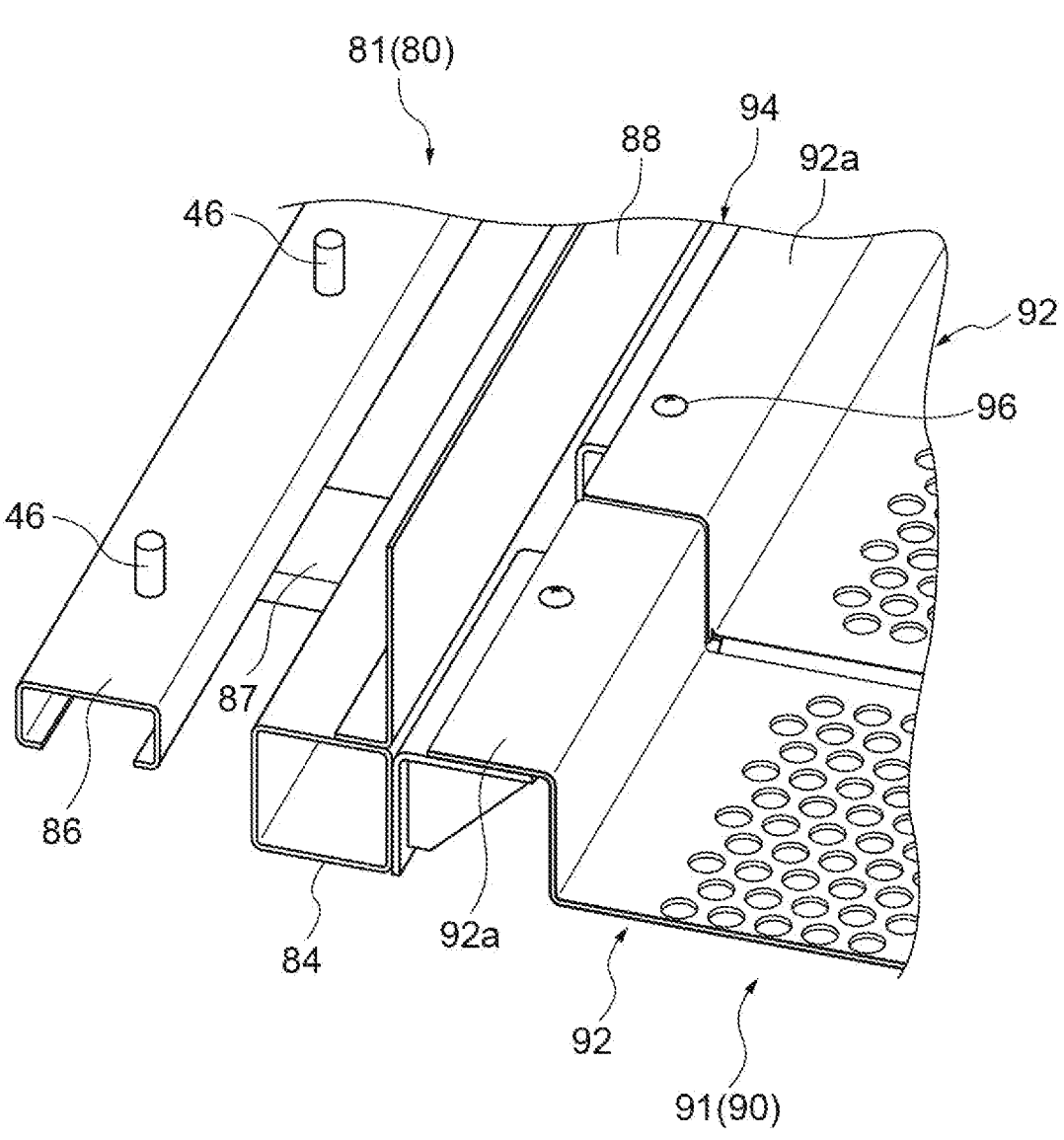
FIG. 13 is a perspective view illustrating a mounting structure of the scaffolding unit.

Meanwhile, as illustrated in FIG. 13, the unit body 91 of the scaffolding unit 90 is joined to the first main frame member 84 and the like of the shelf unit 80, to form a rigid body. The unit body 91 has a main frame member 94. The main frame member 94 is a steel member having a cross section of a square shape and hollow. Although omitting the figure, the unit body 91 may have a plurality of main frame members and sub frame members extending in the X and Y directions, similar to the unit body 81 of the shelf unit 80. The frame strength of the scaffolding unit 90 is higher than that of the shelf unit 80 for the sake of boarding and safety of the worker X. The main frame member 94 is arranged alongside the first main frame member 84 and jointed to the first main frame member 84. A mooring 92a of an L shape formed at an end of the scaffolding plate 92 is placed on the main frame member 94. The mooring 92a may be fixed to the main frame member 94 by a screw 96 or the like. In addition, as illustrated in FIG. 4, a stepboard 97 on which the worker X can step may be installed on a step portion on the scaffolding plate 92.

As illustrated in FIGS. 10 and 13, a tiptoe stop plate 88 made of a steel member having a cross section of an L shape is installed in a standing manner on the first main frame member 84. The tiptoe stop plate 88 extends near a boundary between the first main frame member 84 and the main frame member 94, and prevents the worker X who has boarded on the scaffolding plate 92 from falling (and climbing over to the shelf unit 80 side). In addition, the tiptoe stop plate 88 prevents the article M placed on the shelf unit 80 from falling (and climbing over to the scaffolding unit 90 side). As illustrated in FIG. 10, the tiptoe stop plate 88 made of a steel plate having a cross section of an L shape is also installed in a standing manner on the second main frame member 85. These tiptoe stop plates 88, for example, surround an area of the shelf unit 80.

A specific configuration of the unit support 70B is not limited to the above configuration. For example, as illustrated in FIG. 12(a), a structure may be provided in which a separate pair of the first main frame members 84 and 84 is sandwiched between two ends of the pincer members 76 of a rectangular shape. In addition, as illustrated in FIG. 12(b), a structure may be provided in which separate one or more pairs of the first main frame members 84 and 84 are sandwiched at one or a plurality of corners of the pincer member 76A of a large square plate shape.

In the ceiling storage system SYS of this example, the shelf unit 80 and the scaffolding unit 90 are supported at the bottom end of the suspension member 70 supporting the rail R. The article M is placed on the shelf unit 80 and stored therein. Moreover, the worker X can walk on the scaffolding unit 90 and can perform maintenance work thereon. The corner portion 83 of the shelf unit 80 is supported by the unit support 70B, and the corner portion 93 of the scaffolding unit 90 is supported by the unit support 70B. Therefore, the corner portion 83 or 93 of the shelf unit 80 or the scaffolding unit 90 is arranged at a position of the bottom end of the suspension member 70, and thus layout design of the storage rack 4 can be easily performed. In addition, construction of the storage rack 4 can be easily performed.

With the shelf unit 80 and the scaffolding unit 90 each in a rectangular shape, the layout design of the storage rack 4 can be more easily performed.

The suspension member 70 includes the upper suspension member 71 having the lower end protruding from the rail support 70A and the lower suspension member 72 having the upper end connected to the upper suspension member 71. When the shelf unit 80 and/or the scaffolding unit 90 are provided, the lower suspension member 72 can be attached, and when not provided, the lower suspension member 72 can be omitted. In other words, the lower suspension member 72 can be selectively arranged, and thus the construction can be more easily performed.

The cell C defined by the rail R makes a reference for the shelf unit 80 and the scaffolding unit 90. Therefore, the layout design of the storage rack 4 can be even more easily performed, and the construction of the storage rack 4 can be even more easily performed.

Although this example has been described above, this disclosure is not limited to the example described above. For example, the unit body 81 and the unit body 91 may be installed at different heights. When the shelf unit 80 has a plurality of the unit bodies 81, some of the unit bodies 81 and some other unit bodies 81 may be installed at different heights. When the scaffolding unit 90 has a plurality of the unit bodies 91, some of the unit bodies 91 and some other of the unit bodies 91 may be installed at different heights. In those configurations, two or more pieces of the unit supports 70B may be provided for one piece of the suspension member 70.

On the storage rack 4, the article M with the lid Mb facing inside of the space S1 can be placed. In other words, on the storage rack 4, the article M with the rounded side (front side) opposite to the lid Mb side facing the outside of the space S1 can be placed.

The alignment of the shelf units 80 and the scaffolding units 90 may be freely changed. The shelf unit 80 may be arranged at a butt end of the scaffolding units 90 aligned in a row. The shelf units 80 or the scaffolding units 90 may be aligned in an L shape. As illustrated in FIG. 4, an arrangement may be adopted in which a plurality of the scaffolding units 90 surround the shelf unit 80.

The suspension member 70 is not limited to a configuration of including the upper suspension member 71 and the lower suspension member 72, but the suspension member 70 may be constituted of a single rod-like member.

The invention claimed is:

1. A ceiling storage system comprising:
an overhead transport vehicle having a traveling section traveling on rails arranged at least partly in a grid pattern, and a body section suspended from the traveling section and holding an article on an underside of the rails; and
a storage rack arranged below the rails and storing the article, wherein
the storage rack has
a plurality of suspension members extending in an up-down direction, and having a middle portion provided with a rail support and a bottom end provided with a unit support, and
a shelf unit and a scaffolding unit supported by the unit support of the suspension members, and
a corner portion of the shelf unit and a corner portion of the scaffolding unit are supported by the unit support;

wherein the scaffolding unit is arranged between a shelf unit and another shelf unit.

2. The ceiling storage system according to claim 1, wherein the shelf unit and the scaffolding unit are rectangularly shaped in plan view.

3. The ceiling storage system according to claim 1, wherein the suspension member includes an upper suspension member having a lower end protruding from the rail support and a lower suspension member having an upper end connected to the upper suspension member.

4. The ceiling storage system according to claim 1, wherein
the rail includes
a plurality of first rails extending along a first direction and a plurality of second rails extending along a second direction intersecting the first direction, and
a plurality of intersection rails arranged with a gap to an end of each first rail and to an end of each second rail, the gap allowing a coupling section coupling the traveling section to the body section to pass through the gap,
each cell is defined by a pair of the corresponding first rails aligned in the second direction and a pair of the corresponding second rails aligned in the first direction to form a matrix in a grid pattern, and
the shelf unit and the scaffolding unit each have a shape and a size corresponding to the cells of integer pieces aligned in plan view.

5. A ceiling storage system comprising:
an overhead transport vehicle having a traveling section traveling on rails arranged at least partly in a grid pattern, and a body section suspended from the traveling section and holding an article on an underside of the rails; and
a storage rack arranged below the rails and storing the article, wherein
the storage rack has
a plurality of suspension members extending in an up-down direction, and having a middle portion provided with a rail support and a bottom end provided with a unit support, and
a shelf unit and a scaffolding unit supported by the unit support of the suspension members, and
a corner portion of the shelf unit and a corner portion of the scaffolding unit are supported by the unit support;
wherein the suspension member includes an upper suspension member having a lower end protruding from the rail support and a lower suspension member having an upper end connected to the upper suspension member.

6. A ceiling storage system comprising:
an overhead transport vehicle having a traveling section traveling on rails arranged at least partly in a grid pattern, and a body section suspended from the traveling section and holding an article on an underside of the rails; and
a storage rack arranged below the rails and storing the article, wherein
the storage rack has
a plurality of suspension members extending in an up-down direction, and having a middle portion provided with a rail support and a bottom end provided with a unit support, and
a shelf unit and a scaffolding unit supported by the unit support of the suspension members, and
a corner portion of the shelf unit and a corner portion of the scaffolding unit are supported by the unit support;
wherein the rail includes a plurality of first rails extending along a first direction and a plurality of second rails extending along a second direction intersecting the first direction, and a plurality of intersection rails arranged with a gap to an end of each first rail and to an end of each second rail, the gap allowing a coupling section coupling the traveling section to the body section to pass through the gap, each cell is defined by a pair of the corresponding first rails aligned in the second direction and a pair of the corresponding second rails aligned in the first direction to form a matrix in a grid pattern, and the shelf unit and the scaffolding unit each have a shape and a size corresponding to the cells of integer pieces aligned in plan view.

\* \* \* \* \*